(12) United States Patent
Lim et al.

(10) Patent No.: US 7,082,134 B1
(45) Date of Patent: Jul. 25, 2006

(54) REDIRECT CHECKING IN A NETWORK DEVICE

(75) Inventors: Raymond Marcelino Manese Lim, Los Altos Hills, CA (US); Dennis C. Ferguson, Palo Alto, CA (US); Jeffrey Glenn Libby, Cupertino, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 973 days.

(21) Appl. No.: 10/050,106

(22) Filed: Jan. 18, 2002

(51) Int. Cl.
*H04L 12/28* (2006.01)

(52) U.S. Cl. ............... 370/392; 370/400; 370/410
(58) Field of Classification Search ........... 370/389, 370/392, 400, 410
See application file for complete search history.

(56) References Cited

U.S. PATENT DOCUMENTS

| | | | |
|---|---|---|---|
| 5,905,725 A * | 5/1999 | Sindhu et al. | 370/389 |
| 6,578,087 B1 * | 6/2003 | Garakani et al. | 709/242 |
| 6,885,667 B1 * | 4/2005 | Wilson | 370/392 |
| 6,922,410 B1 * | 7/2005 | O'Connell | 370/401 |
| 6,925,085 B1 * | 8/2005 | Krishna et al. | 370/395.32 |

OTHER PUBLICATIONS

"Redirecting Future Transmissions to an Alternate Router," Optimized Engineering Corporation, http://www.optimized.com/COMPENDI/ICM-Redr.htm, Jun. 18, 2001 (print date), 5 pages.

* cited by examiner

*Primary Examiner*—Andrew C. Lee
(74) *Attorney, Agent, or Firm*—Harrity Snyder LLP

(57) ABSTRACT

A network device for performing redirect checking includes an input device and processing logic. The input device receives a data packet on a first one of a number of interfaces. The data packet includes source and destination addresses. The processing logic assigns an incoming interface to the data packet and generates forwarding information identifying a next hop for the data packet. The processing logic also identifies an outgoing interface based on the next hop and determines whether the incoming interface index is equal to the outgoing interface index. The processing logic also determines whether the data packet originated from a station that is part of the same subnet as the next hop. When both of these conditions are met, the processing logic generates a redirect message.

27 Claims, 6 Drawing Sheets

REDIRECT CHECKING IN A NETWORK DEVICE

BACKGROUND OF THE INVENTION

1. Field of the Invention

The present invention relates generally to data networks and, more particularly, to redirect checking in a network device.

2. Description of Related Art

Conventional network devices, such as routers, transfer packets through a network from a source to a destination. Typically, a host device transmits a data packet to a router that performs a lookup to determine a destination for the data packet. The router often forwards the packet to other routers before the packet reaches its destination.

In some situations, the host device originating the data packet may not forward the data packet to the best router in the network (i.e., the router in the network located closest to the ultimate destination of the packet). In this case, a receiving router may forward the data packet to its appropriate next hop. The receiving router may also transmit a redirect message to the host device providing information regarding the best router in which to forward future data frames having similar destination information.

In conventional systems, redirect messages may be generated when a data packet is received on a wire (i.e., the shared network access medium) and transmitted out on the same wire. A drawback with this approach occurs when more than one subnet is coupled to the same wire. A subnet identifies a group of workstations/devices that share a common network address component (i.e., a portion of their network addresses are the same).

For example, when stations or host devices from different subnets are attached to the same shared network access medium, a first router in a communication path may send a redirect message to a second router that forwarded it a data packet, if the first router determines that the data packet came in and went out on the same interface. The second router, however, may ignore the redirect message since it merely forwarded the data packet from a host device that may be on another subnet or from another router. Sending redirect messages in this situation wastes processing time and increases network congestion since the redirect message is ultimately ignored.

Therefore, there exists a need for systems and methods that provide more efficient redirect checking to prevent generation and transmission of unnecessary redirect messages.

SUMMARY OF THE INVENTION

Systems and methods consistent with the present invention address this and other needs by checking whether the incoming and outgoing interface associated with a data packet are the same and whether the packet originated from a device that is part of the same subnet as the next hop for the data packet. When these conditions are met, the receiving device may forward the data packet and also transmit a redirect message to the originating device.

In accordance with the principles of the invention as embodied and broadly described herein, a method for redirect checking in a network device includes receiving a data packet on a first one of a number of interfaces, assigning an incoming interface index for the data packet and generating forwarding information identifying a next hop for the data packet. The method also includes identifying an outgoing interface index based on the next hop and determining whether the incoming interface index is equal to the outgoing interface index. The method further includes determining whether the data packet originated from a station that is part of a same subnet as the next hop. The method also includes generating a redirect message when the incoming interface index is equal to the outgoing interface index and the data packet originated from a station that is part of a same subnet as the next hop.

In another implementation consistent with the principles of the invention, a network device is provided. The network device includes an input device configured to receive a data packet on a first one of a number of interfaces, the data packet including a source address and a destination address. The network device also includes processing logic configured to assign an incoming interface index to the data packet and generate forwarding information identifying a next hop for the data packet. The processing logic is also configured to identify an outgoing interface index based on the next hop and determine whether the incoming interface index is equal to the outgoing interface index. The processing logic is further configured to determine whether the data packet originated from a station that is part of a same subnet as the next hop.

In a further implementation consistent with the principles of the invention, a network device includes a memory, an input unit, a route lookup unit and an output unit. The memory is configured to store incoming interface index information. The input unit is configured to receive data packets, where each data packet includes a source address. The input unit includes processing logic configured to access the memory to identify an incoming interface index for a received data packet. The route lookup unit is configured to receive the incoming interface index, generate data forwarding information for the data packet and forward the incoming interface index and the data forwarding information. The output unit is configured to receive the incoming interface index and the data forwarding information. The output unit includes a memory that stores an output interface index, a hash value and a prefix length value for each of a plurality of output interfaces. The output unit also includes processing logic configured to retrieve an output interface index, a hash value and a prefix length value based on the data forwarding information for the data packet. The processing logic is also configured to compare the incoming interface index and the outgoing interface index. The processing logic is further configured generate a hash value using a number of bits of the source address of the data packet, based on the prefix length value, and compare the generated hash value to the stored hash value.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Exemplary Network Device Configuration

Figure 1:
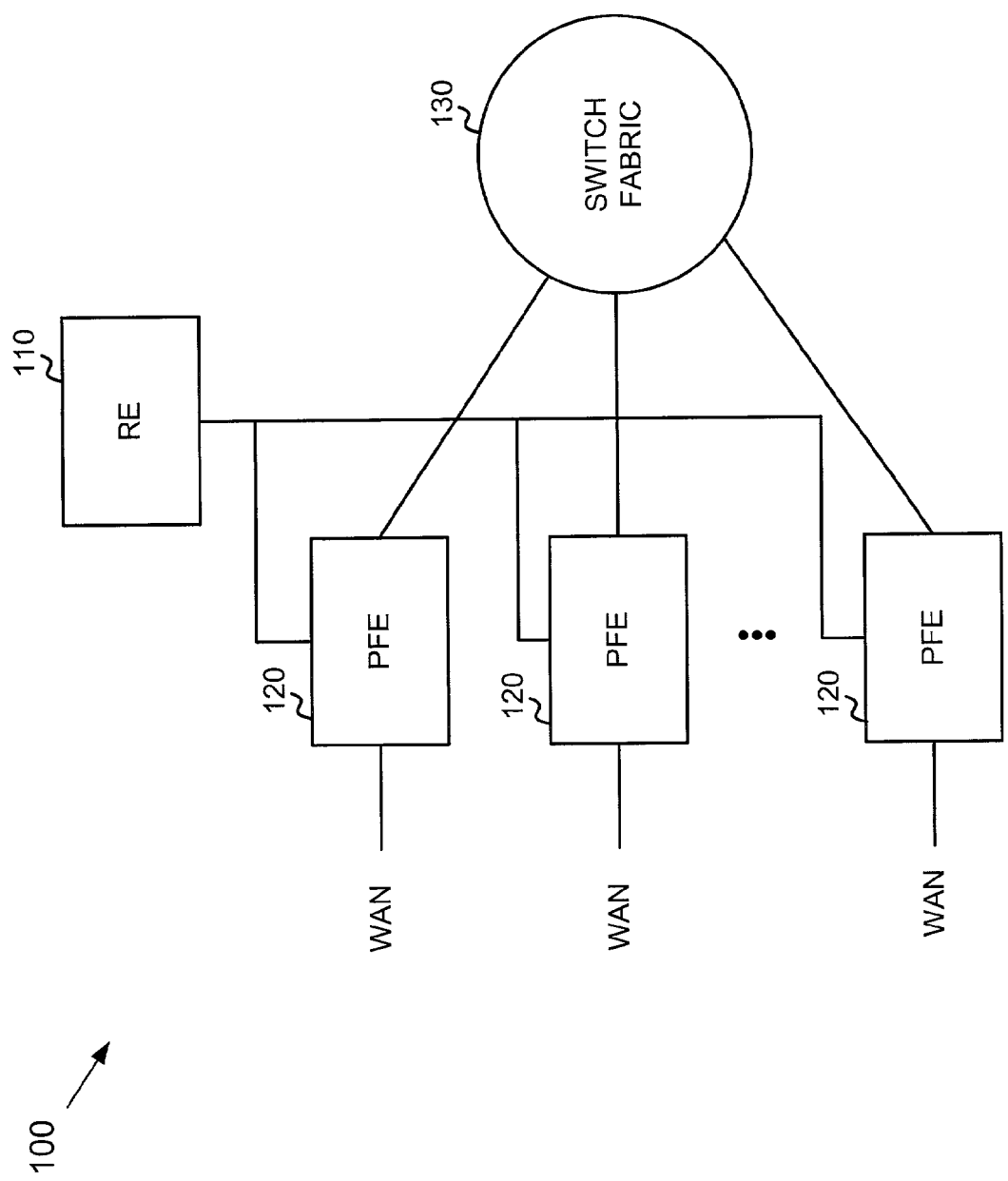
FIG. 1 is a diagram of an exemplary network device in which systems and methods consistent with principles of the invention may be implemented.

FIG. 1 is a diagram of an exemplary network device in which systems and methods consistent with principles of the invention may be implemented. In this particular implementation, the network device takes the form of a router 100. Router 100 may receive one or more packet streams from a physical link, process the stream(s) to determine destination information, and transmit the stream(s) on one or more links based on the destination information.

Router 100 may include a routing engine (RE) 110 and multiple packet forwarding engines (PFEs) 120 interconnected via a switch fabric 130. Switch fabric 130 may include one or more switching planes to facilitate communication between two or more of PFEs 120. In an implementation consistent with principles of the invention, each of the switching planes includes a three-stage switch of crossbar elements.

RE 110 may include processing logic that performs high-level management functions for router 100. For example, RE 110 may communicate with other networks and systems connected to router 100 to exchange information regarding network topology. RE 110 may create routing tables based on network topology information, create forwarding tables based on the routing tables and send the forwarding tables to PFEs 120. PFEs 120 use the forwarding tables to perform route lookup for incoming packets. RE 110 also performs other general control and monitoring functions for router 100.

Each of PFEs 120 connects to RE 110 and switch fabric 130. PFEs 120 receive packets on physical links connected to a network, such as a wide area network (WAN). Each physical link could be one of many types of transport media, such as optical fiber or Ethernet cable. The packets on the physical link are formatted according to one of several protocols, such as the synchronous optical network (SONET) standard or Ethernet.

Figure 2:
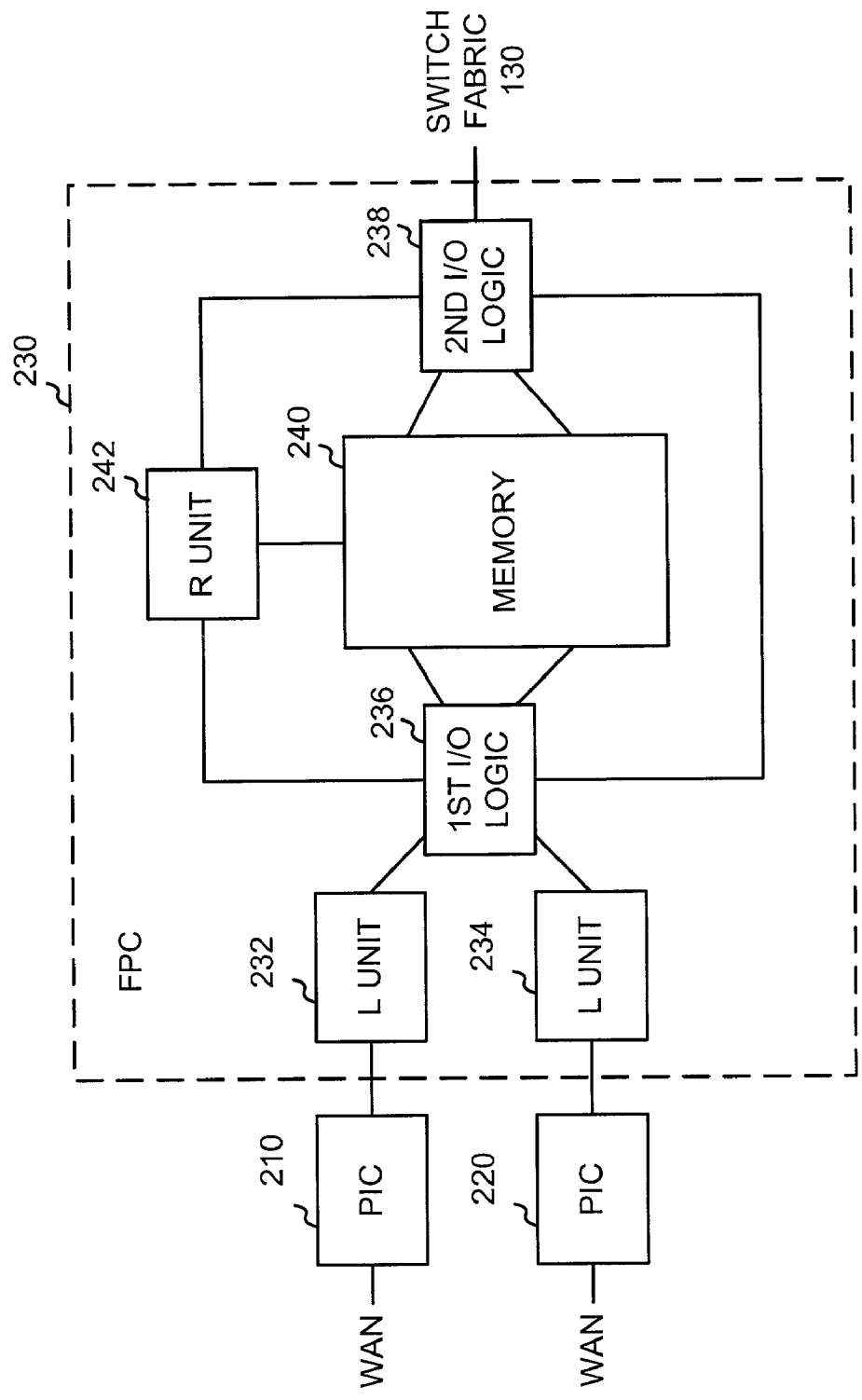
FIG. 2 is an exemplary diagram of a packet forwarding engine (PFE) of FIG. 1 according to an implementation consistent with principles of the invention.

FIG. 2 is an exemplary diagram of a PFE 120 according to an implementation consistent with the principles of the invention. PFE 120 may include physical interface cards (PICs) 210 and 220 connected to a flexible port concentrator (FPC) 230. While two PICs 210 and 220 are shown in FIG. 2, there may be more or fewer PICs in other implementations.

PICs 210 and 220 connect to WAN physical links and FPC 230 and transport data between the WAN physical links and FPC 230. Each of PICs 210 and 220 includes interfacing, processing, and memory elements necessary to transmit data between a WAN physical link and FPC 230. Each of PICs 210 and 220 is designed to handle a particular type of physical link. For example, a particular PIC may be provided to handle only Ethernet communications.

For incoming data, PICs 210 and 220 may strip off the layer 1 (L1) protocol information and forward the remaining data to FPC 230. For outgoing data, PICs 210 and 220 may receive packets from FPC 230, encapsulate the packets in L1 protocol information, and transmit the data on the physical WAN link.

FPC 230 performs packet transfers between PICs 210 and 220 and switch fabric 130. For each packet it handles, FPC 230 may perform route lookup based on packet header information to determine destination information and send the packet either to PIC 210 and 220 or switch fabric 130, depending on the destination information.

FPC 230 may include L units 232 and 234, first input/output (I/O) logic 236, second input/output (I/O) logic 238, memory system 240, and R unit 242. Each of L units 232 and 234 corresponds to one of PICs 210 and 220. L units 232 and 234 may process packet data flowing between PICs 210 and 220, respectively, and first I/O logic 236. Each of L units 232 and 234 may process data flowing in two directions: a first direction corresponding to processing packet data received from PIC 210 or 220 and a second direction corresponding to processing packet data received from first I/O logic 236.

In the first direction, L unit 232 or 234 may process packets from PIC 210 or 220, respectively, convert the packets into data (D) cells, and transmit the D cells to first I/O logic 236. D cells are the data structure used internally by FPC 230 for transporting and storing data. In one implementation, D cells are 64 bytes in length. D cells may be formed by explicit bit patterns at the tail and/or head of each data segment of a packet, or may be formed by processing the stream of bits in segments of certain length, such as 64-byte segments.

Packets received by L unit 232 or 234 may include two portions: a header portion and a packet data portion. For each packet, L unit 232 or 234 may process the header and insert the results of the processing into the D cells. The results may include packet header information and, possibly, other packet-related information. For example, L unit 232 or 234 may parse L2 and L3 headers of incoming packets and insert the results in the D cells. The results might include some of the original header information, as well as processed header information. L unit 232 or 234 may also create control information based on the packet. The control information may be based on the packet header, the packet data, or both. L unit 232 or 234 may then store the results, control information, and the packet data in D cells, which it sends to first I/O logic 236.

For outgoing data, L unit 232 or 234 receives D cells from first I/O logic 236, extracts certain fields and packet data from the D cells, and creates a packet based on the extracted information. L unit 232 or 234 creates the packet header from the fields extracted from the D cells. L unit 232 or 234 may load the packet data portion with the packet data from the D cells.

First I/O logic 236 and second I/O logic 238 coordinate data transfers into and out of FPC 230. First I/O logic 236 receives D cells from L units 232 and 234, and second I/O logic 238 receives D cells from switch fabric 130. Upon receiving D cells for a packet, the I/O logic extracts certain fields from the D cells and creates a notification based on the extracted fields.

First I/O logic 236 and second I/O logic 238 store the D cells in memory system 240. The location of each D cell is also stored in the notification. In one implementation, instead of storing addresses in the notification, only the address of the first D cell is stored in the notification, and the remaining D cell locations are identified in the notification by offsets from the address of the preceding D cell. If the notification cannot store all the D cell addresses, the overflow D cell offsets are stored in memory system 240 in indirect address cells (I cells). After storing the D cells and I cells for a packet in memory system 240, first I/O logic 236 and second I/O logic 238 send a notification to R unit 242. While first I/O logic 236 and second I/O logic 238 are shown as separate units, they may be implemented as a single unit in other implementations consistent with principles of the invention.

R unit 242 may include processing logic that provides route lookup, accounting, and policing functionality. R unit 242 may receive one or more forwarding tables from RE 110 (FIG. 1) and uses the forwarding table(s) to perform route lookups. R unit 242 may insert the lookup result into a notification received from first I/O logic 236 or second I/O logic 238, which it may store in memory system 240.

Memory system 240 may be implemented as one or more memory devices. Memory system 240 may temporarily store data from first I/O logic 236 and second I/O logic 238 and notifications from R unit 242. A notification may include routing information, such as the source and destination of the packet, protocol information, quality of service (QoS) information, validity information, priority information, and data length information. A notification may also include data cell address information and address offset information. The data cell address may store an actual address of a data cell, such as the first data cell, stored in memory system 240. The address offset information may store data that identifies an offset for each of the remaining data cells for the packet stored in memory system 240. For example, each offset may define the location of a D cell relative to the location defined by the previous offset. In an implementation consistent with the principles of the invention, the data cells of a packet are stored at non-contiguous locations within memory system 240. For example, memory system 240 may include a number of data banks. Data cells from one packet may be distributed among one or more of the memory banks.

As discussed previously, each PIC may handle processing for a particular type of physical link. For the discussion below, assume that PIC 210 processes Ethernet packets. In this implementation, L unit 232 may perform redirect checking, as described in more detail below.

Figure 3:
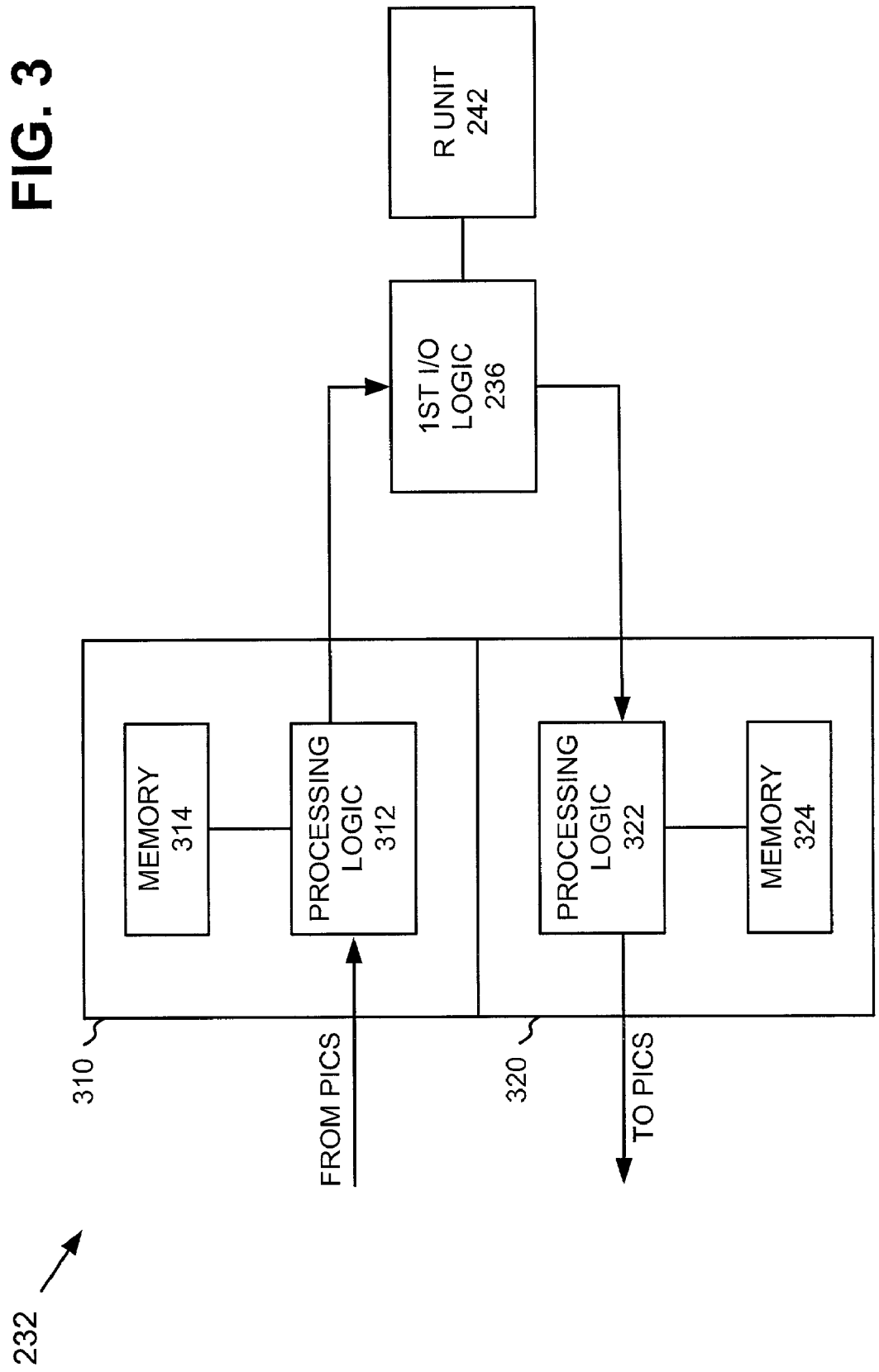
FIG. 3 is an exemplary diagram of a portion of the L unit of FIG. 2 according to an implementation consistent with principles of the invention.

FIG. 3 is an exemplary diagram of a portion of L unit 232 according to an implementation consistent with principles of the invention. L unit 232 includes input unit 310 and output unit 320. Input unit 310 includes processing logic 312 and memory 314, and processes packets received from PIC 210. Output unit 320 includes processing logic 322 and memory 324, and processes data received from first I/O logic 236.

Processing logic 312 receives Ethernet packets from PIC 210. Processing logic 312 performs various processing for the packet header portion and for the packet data portion of the packet. For example, when processing logic 312 receives a data packet, it performs an incoming interface index lookup to identify the particular interface on which the packet was received, as described in more detail below.

Memory 314 may be a conventional memory device, such as a static random access memory (SRAM) that stores information for processing logic 312. For example, memory 314 may store a table that provides an incoming interface (IIF) index for each of the interfaces on which the data packets may be received. When processing logic 312 receives a packet, it accesses memory 314 to identify the IIF index associated with interface on which the particular packet was received. This IIF index may be forwarded along with the data packet to first I/O logic 236.

First I/O logic 236 may forward the IIF index, along with the packet information to R unit 242. R unit 242, as described above, performs route lookups for the data packets. R unit 242 may access forwarding tables to generate next hop information for the data packets. R unit 242 may forward the next hop information to L unit 232, via first I/O logic 236. As discussed previously, the data received by R unit 242 includes an IIF index. The R unit 242 may also forward this IIF index along with the next hop information to L unit 232.

Output unit 320 receives the next hop information from R unit 242 and forwards the data packets to their appropriate destination via PIC 210. Processing logic 322 may also perform redirect checking associated with the next hop information, as described in more detail below.

Memory 324 may include a conventional memory device, such as an SRAM, that stores information for processing logic 322. As described above, for interfaces that require redirect checking, such as Ethernet, the next hop information may be used to perform a lookup to identify information associated with performing redirect checking. For example, the next hop information may be used to identify a prefix length value, a hash value and an OIF index associated with the next hop. Memory 324 may store this information for use by processing logic 322.

Figure 4:
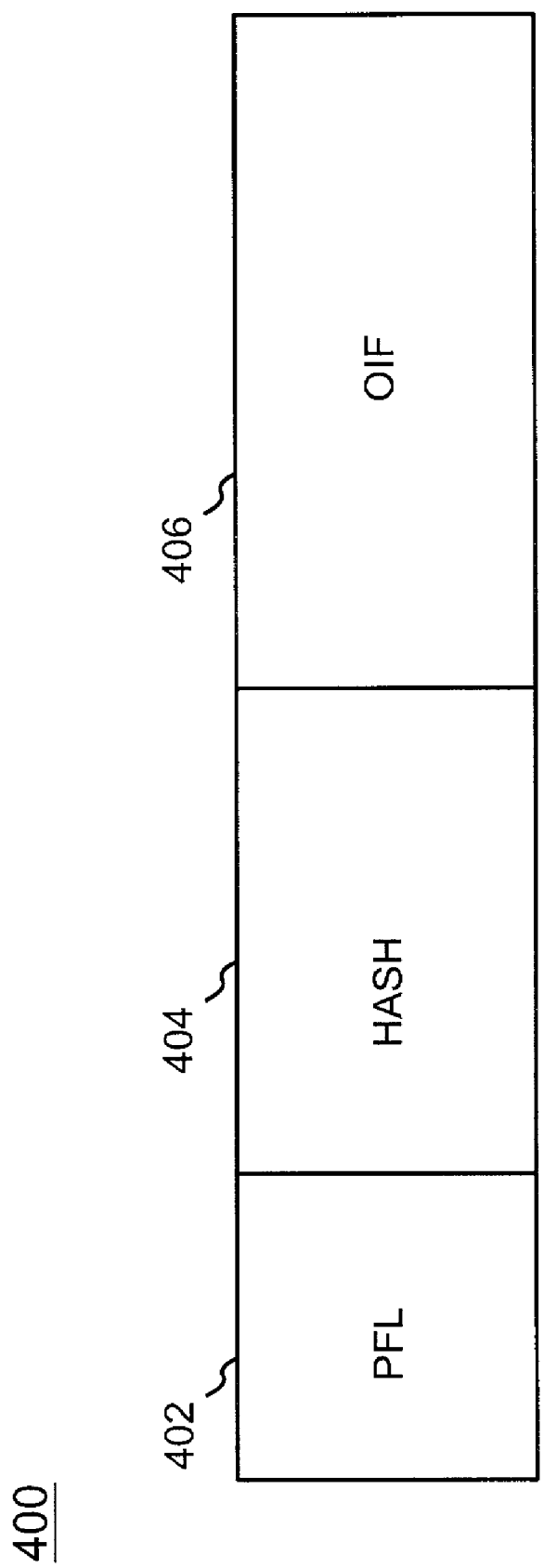
FIG. 4 is an exemplary diagram of word comprising a number of fields used for performing redirect checking according to an implementation consistent with principles of the invention.

For example, in an exemplary implementation consistent with principles of the invention, memory 324 stores 32 bits of information along with the next hop information generated by R unit 242. FIG. 4 illustrates an exemplary 32-bit data word 400 consistent with principles of the invention that may be stored in memory 324.

The 32-bit word 400 includes a 5-bit prefix length field 402, a 9-bit hash value field 404 and an 18-bit OIF field 406. It should be understood, however, that the field lengths may vary in other implementations consistent with principles of the invention. The 5-bit prefix length field 402 stores a value that indicates which bits of an Internet Protocol (IP) source address associated with the data packet will be used to generate a hash value, as described in more detail below.

The 9-bit hash value field 404 stores a hash value that represents a subnet (i.e., a subnet identifier) associated with the interface on which the data packet is to be forwarded. As described previously, a subnet identifies a group of workstations or other devices that share a network address component. That is, a portion of the bits of their respective source addresses (e.g., the most significant bits) are the same. In an exemplary implementation consistent with principles of the invention, the 9-bit hash value may store the hash of an IP address that represents the subnet on which the data packet is to be forwarded. The 9-bit hash value may be obtained by taking a specified number of the most significant bits of an IP source that represents the subnet and applying a hash function to these most significant bits. Processing logic 322 uses this 9-bit hash value for checking against information associated with the actual source address of the data packet to determine whether data packet originated from a station in the same subnet as the next hop for the data packet, as described in more detail below.

For example, when output unit 320 receives a packet on an interface that requires redirect checking, it accesses memory 324 to identify the appropriate next hop redirect checking information, i.e., the 32-bit word 400 associated with the next hop. In an exemplary implementation, processing logic 322 uses the prefix length value and a predetermined hash function to generate a hash value, as described in more detail below. The processing logic 322 may then compare this hash value to the hash value stored in field 404 to determine whether the packet originated from a station that is part of the same subnet as the next hop. This is one part of the redirect checking.

The OIF field 406 stores the OIF index associated with the next hop for the data packet. Processing logic 322 compares the OIF index and the IIF index to determine whether the data packet came in on and went out on the same interface. This is another part of the redirect checking. When both of these conditions are met (i.e., hash values are equal and the OIF index equals the IIF index), this indicates that a redirect message needs to be transmitted to the originating station, as described in more detail below.

Exemplary Processing

Figure 5:
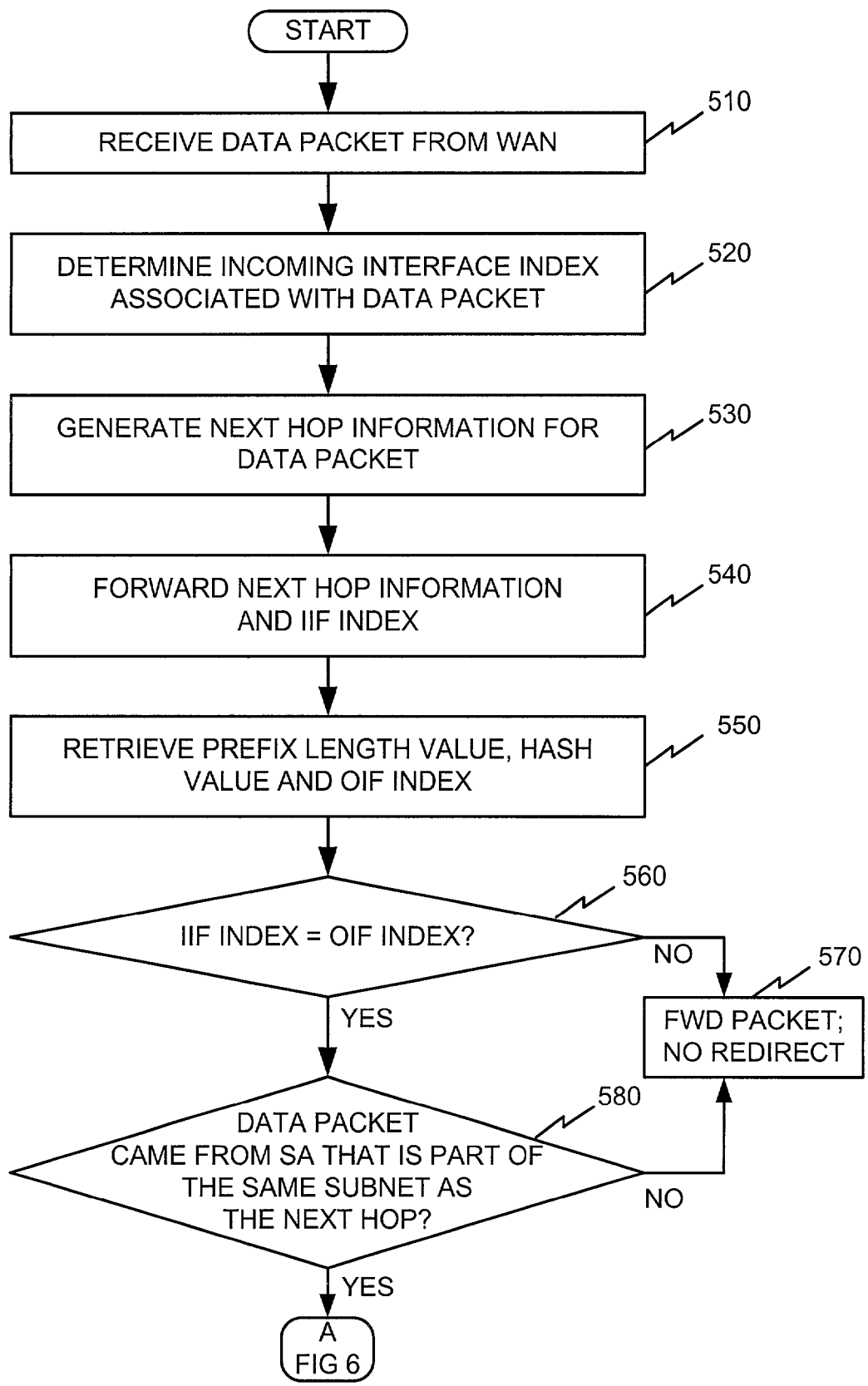
FIGS. 5 and 6 are flowcharts of exemplary processing associated with redirect checking according to an implementation consistent with principles of the invention.
Figure 6:
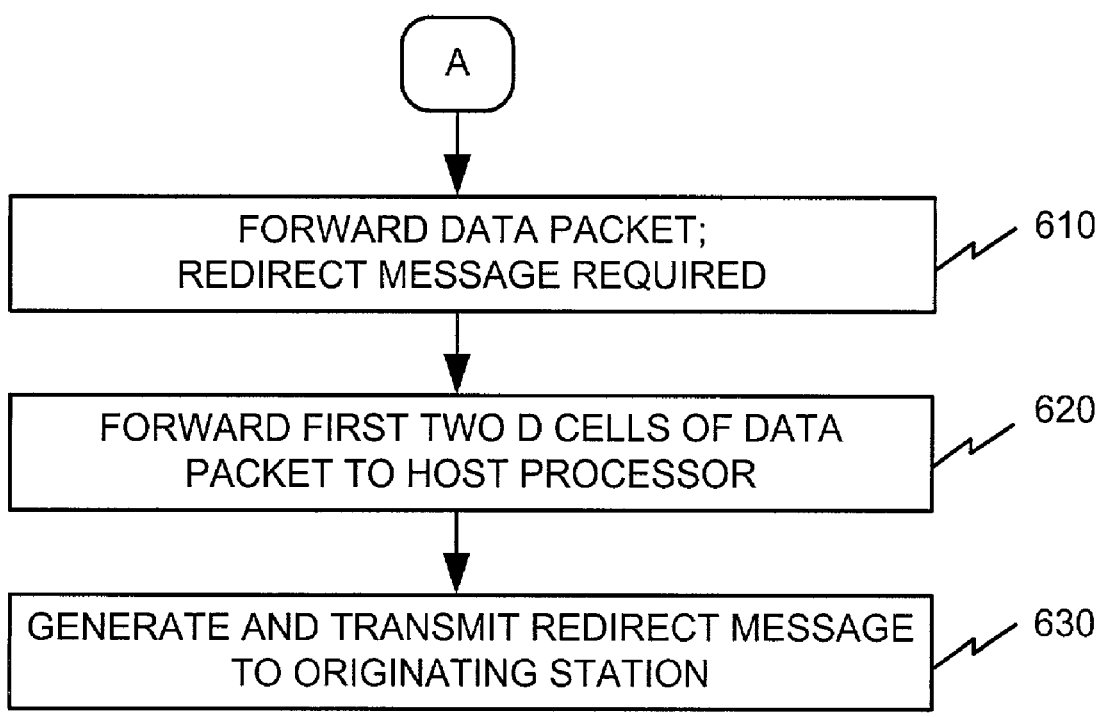

FIGS. 5 and 6 are flow diagrams illustrating exemplary processing associated with performing redirect checking, according to an implementation consistent with principles of the invention. Processing may begin with PIC 210 receiving data packets from the WAN (act 510). As discussed previously, assume PIC 210 is configured to receive Ethernet packets. PIC 210 forwards the Ethernet packets to L unit 232.

In an exemplary implementation consistent with principles of the invention, when L unit 232 receives an Ethernet packet, such as an IPv4 Ethernet packet, processing logic 312 accesses memory 314 and determines the incoming interface (IIF) index associated with the data packet (act 520). L unit 232 may also generate an IIF index for other non-Ethernet data packets. As described previously, processing logic 312 may access a table stored in memory 314 that correlates the interface to an IIF index to identify the appropriate IIF index.

Processing logic 312 may then forward the data packet along with the IIF index to first I/O logic 236. First I/O logic, as described previously, may pass the header information associated with the packet to R unit 242. R unit 242 performs a route lookup using, for example, forwarding tables, to identify the next hop for the data packet (act 530). R unit 242 forwards the next hop information along with the IIF index to first I/O logic 236, where it may then be forwarded to L unit 232 (act 540).

Output unit 320 receives the next hop information from R unit 242 and performs a lookup to retrieve the appropriate 32-bit word 400 stored in memory 324 that corresponds to the next hop (act 550). Memory 324, as described previously, includes a 32-bit word of data corresponding to each of the outgoing interfaces on which the data packets may be forwarded. Processing logic 322 may then perform redirect checking to determine whether a redirect message is required. For example, processing logic 322 accesses memory 324 and determines whether the IIF index for the data packet is equal to the OIF value in field 406 (act 560). In other words, processing logic 322 determines whether the packet came in on and went out on the same interface. This is a first part of the redirect checking performed by processing logic 322. If the IIF does not equal the OIF, no redirect message is required and the data packet is merely forwarded to its next hop (act 570).

If the IIF index is equal to the OIF index, processing logic 322 determines whether the data packet originated from a station that is part of the same subnet as the next hop for the data packet (act 580). In other words, processing logic 322 determines whether the data packet is being routed to the same subnet that it arrived on. In an exemplary implementation, processing logic 322 reads the 5-bit prefix length field 402 to determine which bits of the source address (SA) to use in calculating a hash value associated with the IP source address of the data packet. For example, if the prefix length field 402 stores the value 00100 (i.e., "4"), this indicates that the hash value will be generated using the five most significant bits (prefix value+1) of the IP source address included with the data packet. Processing logic 322 zeroes out the remaining bits of the IP source address and passes the designated most significant bits (i.e., the 5 bits in this example) through a hash function to generate the hash value. In an exemplary implementation consistent with principles of the present invention, the hash function is $x^9+x^4+1$. It should be understood that other hash functions may be used in alternative implementations. In each case, however, processing logic 322 uses the same hash function to generate the hash value associated with the IP source address of the data packet as that used to generate the stored hash value in memory 324. It should also be understood that processing logic 322 uses the same number of the most significant bits of the data packet's source address as that used to generate the stored hash value in memory 324.

After running the designated bits through the hash function, processing logic 322 outputs a hash value and compares this hash value to the hash value stored in memory 324. When these hash values are not equal, no redirect message is required and the data packet is merely forwarded to its next hop (act 570).

When the hash values are equal, however, this indicates that the data packet originated from a station that is part of the same subnet as the address to which the packet is being forwarded. That is, the data packet is being routed to the same subnet as the subnet on which it arrived. As a result, a redirect message may be required. In summary, if the IIF index=OIF index and the hashfunc(IP source address included by PFL field 402)=the value stored in HASH field 404, L unit 232 signals a host processor (not shown) that a redirect message is required (act 610, FIG. 6). If, however, both conditions are not met, no redirect message is required. In either case (redirect message required or no redirect message required) processing logic 322 forwards the data packet to its next hop.

If a redirect message is required, L unit 232 sends a copy of the data packet's first two D cells to the host processor, according to an exemplary implementation consistent with the principles of the invention (act 620). The first two D cells may be stored in memory system 240 (FIG. 2) and include the header information associated with the data packet. The host processor may then generate a redirect message informing the origination station of the proper next hop for future data packets that include the same destination information as the current data packet (act 630). The host processor then transmits the redirect message to the station that transmitted the data packet (act 630). In alternative implementations, the L unit 232 may perform the processing associated with generating and transmitting the redirect message. In any event, the station that transmitted the data packet is made aware of the proper next hop for future data packets that include the same destination information, thereby enabling the data packets to be forwarded to their ultimate destination more quickly.

CONCLUSION

Systems and methods, consistent with the principles of the invention, provide a redirect checking mechanism that prevents the generation and transmission of many unnecessary redirect messages. Systems and methods consistent with principles of the invention also limit the memory requirements for storing data associated with performing the redirect processing by generating hash values of the appropriate addresses instead of storing the entire source addresses, thereby saving significant memory space. In addition, preventing unnecessary generation of redirect messages saves processing time and lessens network congestion by avoiding transmitting redirect messages that may be ultimately ignored.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while a series of acts have been described in relation to FIGS. 5 and 6, the order of the acts may vary in other implementations when a particular order is not required. In addition, while the size of the word associated with storing various data needed to perform redirect checking have been described as being 32 bits in length, the size of the word and the individual fields may vary in other implementations based on system requirements, such as memory space constraints. Also, while systems and methods have been described in terms of a network device, such as a router, the present invention may have applicability in other devices, such as switches, where redirect messages may be required. Lastly, while processing as has been described as being performed by particular components of the network device, it should be understood that the processing described as being performed by one component may be performed by other components in alternative implementations of the present invention.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed is:

1. A method for redirect checking in a network device, comprising:
   receiving a data packet on a first one of a plurality of interfaces;
   assigning an incoming interface index to the data packet;
   generating forwarding information identifying a next hop for the data packet;
   identifying an outgoing interface index based on the next hop;
   determining whether the incoming interface index is equal to the outgoing interface index;
   determining whether the data packet originated from a station that is part of a same subnet as the next hop; and
   generating a redirect message when the incoming interface index is equal to the outgoing interface index and the data packet originated from a station that is part of a same subnet as the next hop.

2. The method of claim 1, wherein the identifying an outgoing interface includes:
   retrieving a stored outgoing interface index based on the forwarding information.

3. The method of claim 1, wherein the data packet includes a source address and the determining whether the data packet originated from a station that is part of a same subnet as the next hop includes:
   selecting a number of the most significant bits of the source address of the data packet,
   passing the selected bits through a hash function to generate a hash value,
   comparing the generated hash value to a stored hash value, and
   determining that the data packet originated from a station that is part of the same subnet as the next hop when the generated hash value equals the stored hash value.

4. The method of claim 3, wherein the hash function is $x^9+x^4+1$.

5. The method of claim 3, wherein the stored hash value is based on a first address associated with the next hop and is generated using the same hash function and the same number of most significant bits of the first address as the generated hash value.

6. The method of claim 1, further comprising:
   transmitting the redirect message to the station originating the data packet, the redirect message including next hop information for future data packets having a same destination address as the data packet transmitted to the network device.

7. The method of claim 1, further comprising:
   bypassing the generation of the redirect message when either the incoming interface index is not equal to the outgoing interface index or the data packet originated from a station that is not part of the same subnet as the next hop.

8. A network device, comprising:
   an input device configured to receive a data packet on a first one of a plurality of interfaces, the data packet including a source address and a destination address; and processing logic configured to:
   assign an incoming interface index to the data packet,
   generate forwarding information identifying a next hop for the data packet,
   identify an outgoing interface index based on the next hop,
   determine whether the incoming interface index is equal to the outgoing interface index,
   determine whether the data packet originated from a station that is part of a same subnet as the next hop, and
   generate a redirect message when the incoming interface index is equal to the outgoing interface index and the data packet originated from a station that is part of a same subnet as the next hop.

9. The network device of claim 8, wherein when identifying an outgoing interface index, the processing logic is configured to:
   retrieve a stored outgoing interface index based on the forwarding information.

10. The network device of claim 8, wherein when determining whether the data packet originated from a station that is part of a same subnet as the next hop, the processing logic is configured to:
   select a number of the most significant bits of the source address of the data packet,
   pass the selected bits through a hash function to generate a hash value,
   compare the generated hash value to a stored hash value, and
   determine that the data packet originated from a station that is part of the same subnet as the next hop when the generated hash value equals the stored hash value.

11. The network device of claim 10, wherein the hash function is $x^9+x^4+1$.

12. The network device of claim 10, wherein the stored hash value is based on a first address associated with the next hop and is generated using the same hash function and the same number of most significant bits of the first address as the generated hash value.

13. The network device of claim 8, wherein the processing logic is further configured to:
    transmit the redirect message to the station originating the data packet, the redirect message including next hop information for future data packets having a same destination address as the data packet transmitted to the network device.

14. The network device of claim 8, wherein the processing logic is further configured to:
    bypass the generation of the redirect message when either the incoming interface index is not equal to the outgoing interface index or the data packet originated from a station that is not part of the same subnet as the next hop.

15. A network device, comprising:
    an input device configured to receive a data packet, the data packet including a source address and a destination address;
    processing logic configured to assign an incoming interface index to the data packet based on the interface on which the data packet was received;
    route lookup logic configured to:
        receive the incoming interface index,
        generate data forwarding information identifying a next hop for the data packet,
        forward the data forwarding information and the incoming interface index; and an output device configured to:
        receiving the data forwarding information and the incoming interface index,
        retrieve redirect checking information based on the data forwarding information,
        determine, using the redirect checking information, whether the data packet is to be forwarded on the same interface on which it was received, and
        determine, using the redirect checking information, whether the data packet originated from a station that is part of a same subnet as the next hop for the data packet.

16. The network device of claim 15, further comprising:
    a host processor;
    wherein the output device is further configured to:
        forward a message to the host processor indicating that a redirect message associated with the received data packet is required when the data packet is to be forwarded on the same interface on which it was received and the data packet originated from a station that is part of the same subnet as the next hop.

17. The network device of claim 16, wherein the host processor is configured to:
    receive the message,
    generate a redirect message, and
    transmit the redirect message to the station originating the data packet.

18. The network device of claim 15, wherein the redirect checking information comprises:
    an outgoing interface index, a hash value and a prefix length value associated with the hash value.

19. The network device of claim 18, wherein when determining whether the data packet is to be forwarded on the same interface on which it was received, the output device is configured to:
    compare the incoming interface index and the outgoing interface index.

20. The network device of claim 18, wherein when determining whether the data packet originated from a station that is part of a same subnet as the next hop, the output device is configured to:
    read the prefix length value,
    select a number of bits of the source address of the data packet based on the prefix length value,
    generate a hash value using the selected bits of the source address,
    compare the generated hash value to the stored hash value, and
    determine that the data packet originated from a station that is part of the same subnet as the next hop when the generated and stored hash values are equal.

21. The network device of claim 15, wherein when determining whether the data packet originated from a station that is part of a same subnet as the next hop, the output device is configured to:
    generate a hash value using a portion of the source address of the data packet, and
    compare the hash value to a predetermined hash value.

22. A system for performing redirect checking in a network device, comprising:
    means for receiving a data packet on a first one of a plurality of interfaces;
    means for generating forwarding information for the data packet;
    means for retrieving stored information associated with a next hop for the data packet;
    means for determining whether the data packet is to be forwarded on the first interface using the retrieved information;
    means for determining whether the data packet originated from a station that is part of a same subnet as the next hop; and
    means for generating a redirect message when the data packet is to be forwarded on the first interface and the data packet originated from a station that is part of the same subnet as the next hop.

23. A network device, comprising:
    a memory configured to store incoming interface index information;
    an input unit configured to receive data packets, each data packet including a source address, the input unit including:
        processing logic configured to access the memory to identify an incoming interface index for a received data packet;
    a route lookup unit configured to:
        receive the incoming interface index for the data packet,
        generate data forwarding information for the data packet, and
        forward the incoming interface index and the data forwarding information; and
    an output unit configured to receive the incoming interface index and the data forwarding information, the output unit including:
        a memory configured to store an output interface index, a hash value and a prefix length value for each of a plurality of output interfaces, and processing logic configured to:
retrieve an output interface index, a hash value and a prefix length value based on the data forwarding information for the data packet,
compare the incoming interface index and the outgoing interface index,
generate a hash value using a number of bits of the source address of the data packet, based on the prefix length value, and
compare the generated hash value to the stored hash value.

24. The network device of claim 23, wherein when the incoming interface index and the outgoing interface index are equal and the generated hash value and the stored hash value are equal, the processing logic is further configured to indicate that a redirect message is required.

25. The network device of claim 24, further comprising:
a host processor, wherein when the redirect message is required, the output unit transmits a redirect indication to the host processor.

26. The network device of claim 25, wherein the host processor is configured to forward a redirect message to the station that originated the data packet, the redirect message including next hop information for future data packets having a same destination address as the data packet transmitted to the network device.

27. The network device of claim 23, wherein the hash value is generated using a hash function of $x^9+x^4+1$.

* * * * *